United States Patent

[11] 3,566,801

| [72] | Inventor | Joseph Ashurst<br>Wigan, England |
|---|---|---|
| [21] | Appl. No. | 794,266 |
| [22] | Filed | Jan. 27, 1969 |
| [45] | Patented | Mar. 2, 1971 |
| [73] | Assignee | Gullick Limited<br>Wigan, England |
| [32] | Priority | Feb. 28, 1968 |
| [33] | | Great Britain |
| [31] | | 9608/68 |

[54] TRANSPORT MEANS
14 Claims, 4 Drawing Figs.

[52] U.S. Cl. .................................... 104/173,
104/162, 198/218, 104/202
[51] Int. Cl. ........................................ B61b 9/00,
B61b 7/20
[50] Field of Search ........................................ 104/162,
165, 173; 198/202; 105/218, 128; 213/7

[56] References Cited
UNITED STATES PATENTS

| 1,840,042 | 1/1932 | Knuutila .................. | 198/218 |
| 1,871,451 | 8/1932 | Geiger ..................... | 213/7 |
| 2,583,968 | 1/1952 | Rosseau ................... | 104/162 |
| 2,644,573 | 7/1953 | Joy ........................... | 104/165 |
| 3,055,313 | 9/1962 | Stoll ......................... | 104/173 |
| 3,208,401 | 9/1965 | Freeman .................. | 104/162 |

Primary Examiner—Arthur L. La Point
Assistant Examiner—D. W. Keen
Attorney—Imirie and Smiley ABSTRACT: A transport means comprises a carriage and an elongated member, for example, a flexible cable, anchored at and extending between the ends of a path to be travelled by said carriage. Means is provided for oscillating said elongated member in the direction of its length and the carriage is connected to the elongated member by a unidirectional driving device whereby the vehicle is caused to travel in one direction along the length of the elongated member when the latter is oscillated. Two oppositely acting unidirectional driving devices may be provided for connecting the carriage to the elongated member, one or other of these unidirectional driving devices being selected according to the direction along the elongated member in which it is desired that the carriage should travel.

Patented March 2, 1971
3,566,801
2 Sheets-Sheet 1
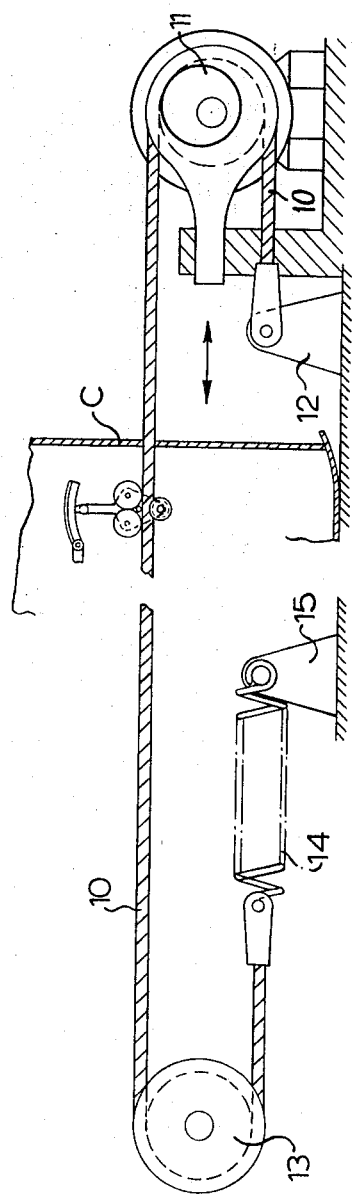
—FIG.1.—
INVENTOR:
JOSEPH ASHURST
BY Patented March 2, 1971
3,566,801
2 Sheets-Sheet 2
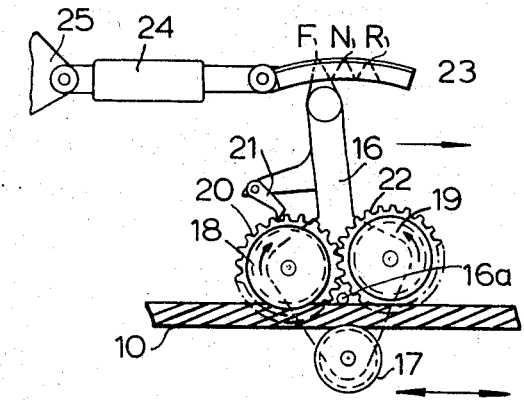
—FIG. 2—
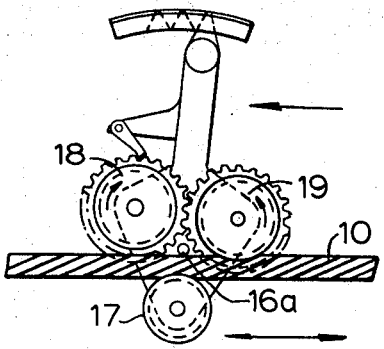
—FIG. 3—
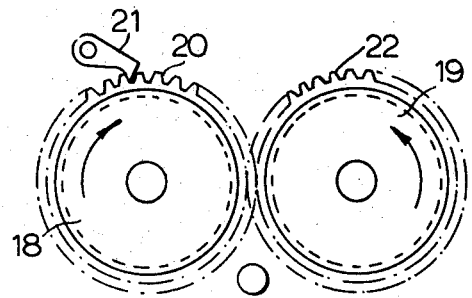
—FIG. 4—
INVENTOR:
JOSEPH ASHURST
BY
Toulmin & Smiley
ATTYS.

TRANSPORT MEANS

This invention is for improvements in or relating to transport means.

A particular application of the invention which is mentioned by way of example, is to a transport means for transporting men and material along the mineral face in a mine being worked by the longwall method.

According to the present invention there is provided a transport means comprising an elongated member, means for vibrating or oscillating said elongated member in the direction of its length, and a unidirectional driving device for attaching a vehicle or carriage to said member whereby said vehicle or carriage will be caused to travel in the direction of length of the elongated member.

Conveniently two oppositely acting unidirectional driving devices are provided for attaching the vehicle or carriage to the elongated member. By an appropriate selection of one or other of these devices the carriage can be caused to travel in either direction.

The carriage may be a wheeled carriage or a sledge.

The elongated member may, for example, be a rope, preferably a wire rope, cable or the like, or alternatively a bar (e.g. a rigid bar) running the length of the mineral face.

The vibratory or oscillatory movement of the elongated member may be imparted to it by a cam (rotary or linear) or by an eccentric driven by a motor or by other devices adapted to convert rotary into linear motion. Alternatively, movement may be imparted to the elongated member by a hydraulic or pneumatic vibratory device similar, for example, to a hydraulic or pneumatic hammer, or by an electromagnetic vibratory device.

Since the elongated member will generally be of great length relative to its width, a tensioning device or devices may be incorporated in it. These may, for example, be hydraulic or mechanical, e.g. consist of a spring or springs.

The unidirectional drive devices, one or the other of which will be selected according to the direction in which it is desired the carriage should move, may have a intermediate position in which the vehicle is stationary.

The unidirectional driving device or devices may incorporate an overrum device of known form so that movement imparted to the vehicle or carriage will be substantially constant or uniform. In other words, the momentum of the vehicle will keep it moving during the return or idle stroke of the elongated member. Shock absorbers may also be included in the unidirectional driving device or devices so as to dampen or even-out the driving force imparted to the vehicle.

One particular embodiment of the invention will now be described as applied to a transport system for use more particularly for transporting men and materials along a mineral face. In the following description reference is made to the accompanying diagrammatic drawings in which:

FIG. 1 is a side elevation; and

FIGS. 2, 3 and 4 are fragmentary detail views.

The transport means shown on the drawings comprises a rope 10 which extends for the whole length of the mineral face. At the main gate of the mine working the rope 10 is taken over the reciprocating strap of a motor-driven eccentric or cam mechanism 11 and attached to an anchorage 12.

At the tail end or remote end of the workings the rope 10 is taken over a pulley 13 and attached to a tensioning spring 14 having a fixed anchorage 15.

When the eccentric or cam mechanism 11 is rotated a vibratory motion is imparted to the rope 10 in the direction of its length. The frequency of vibration may, for example, be of the order of 50 vibrations per second with an amplitude of one-fourth inch. The frequency and/or amplitude may be made adjustable by providing a variable speed motor for driving the eccentric or cam or alternatively by providing an adjustable cam having a single or multiple high point or points.

Mounted on a carriage or sledge C, to be propelled along the mineral face by the rope 10, is a unidirectional driving device. This comprises (see FIGS. 2, 3 and 4) a lever 16 pivoted on a shaft 16a secured in opposite sidewalls of the sledge C. The lever 16 carries a tensioning pulley 17 and two further pulleys 18 and 19, the rope 10 passing through the body of the sledge and between the pulley 17 and the pulleys 18 and 19.

Fixed against one end of the pulley 18, for rotation therewith (see FIG. 4), is a ratchet wheel 20 which is engaged by a pawl 21 on the arm 16, the arrangement being such that the pulley wheel 18 can rotate or idle in the clockwise direction but is held and holds the pulley wheel 18 against rotation in the anticlockwise direction. A ratchet wheel 22, similarly fixed on the pulley 19, meshes with or is geared to the ratchet wheel 20 so that the pulley wheel 19 is free to rotate in the anticlockwise direction but not in a clockwise direction.

The free end of the arm or lever 16 engages with a gate 23 fixed between the sidewalls of the sledge and having three positions, namely, F for forward movement of the sledge, R for reverse movement thereof and N for neutral in which position the sledge is stationary.

The rope 10 is of a prestretched type and the vibratory motion is transmitted to it throughout the length of the face, tension being maintained by the spring 11.

To propel the sledge in the forward direction, i.e. from gate to tail end, the arm 16 is moved to the position F in the gate 23 as shown in FIG. 2. This causes the pulley wheels 17 and 18 to hold onto the rope 10 when it is moved to the right (as seen in FIG. 2) but to release the rope or let it run free when it moves or idles to the left. Thus, movement is transmitted from the rope and, through the shaft 16a, to the sledge which moves in the forward direction, i.e. from main gate to tail end of the mine working. When the lever 16 is moved to the position R in the gate 23, as shown in FIG. 3, the rope 10 is held between the pulley wheels 17 and 19 when it moves to the left but is released or allowed to run free to make its idle return stroke to the right. Thus, motion is then transmitted to the sledge in the reverse direction, i.e. from tail end to main gate.

It will be appreciated that this transport system requires very little height or headroom This makes it ideal for mine working, particularly where there are low seams along which a ledge or low vehicle can travel.

A shock absorber 24 (see FIG. 2) may be connected between a bracket 25 on the carriage C and the gate 23, the latter being supported so that it is permitted a limited degree of movement under the control of said shock absorber. This arrangement tends to dampen or even-out the driving force imparted to the carriage.

I claim:

1. A transport means for transporting a person along a mineral face in a mineral mine comprising an elongated member, means supporting said elongated member at least at its ends so that it extends along said mineral face, between said supporting means, without reverse bending, means for oscillating said elongated member in the direction of its length, a carriage for said person and a unidirectional holding device on said carriage by which it may hold onto said elongated member and thereby be moved through a passage along said mineral face by the oscillation of said member, said holding device including two members between which the elongated member passes without reverse bends and which are operative to permit relative movement between the elongated member and the holding device when the elongated member is oscillated in one direction and to prevent such relative movement when the elongated member is moved in the reverse direction.

2. A transport means as claimed in claim 1 wherein the holding means comprises a pair of members and a single member between which the elongated member passes, and means for selecting for operation with said single member one or the other of said pair of members, said single member and one of the pair of members, when selected, being operative to prevent relative movement between the elongated member and the holding means in one direction only and said single member and the other of said pair of members, when selected, being operative to prevent relative movement between the holding means and said elongated member in the opposite direction whereby the carriage can be caused to travel in either direction along said passage.

3. A transport means as claimed in claim 2 wherein said pair of members has an intermediate position in which relative movement between the elongated member and the holding means can take place in either direction whereby motion is not transmitted to the carriage in either direction when the elongated member is oscillated.

4. A transport means as claimed in claim 1 wherein said two members of the holding device are pulley wheels.

5. A transport means as claimed in claim 1 wherein one of said members of the holding device includes a ratchet wheel which is held against rotation in one direction by a pawl.

6. A transport means as claimed in claim 2 wherein the unidirectional holding device includes a gate for positioning said selecting means in the selected position.

7. A transport means as claimed in claim 1 wherein the carriage is a sledge.

8. A transport means as claimed in claim 1 wherein the elongated member is a flexible cable.

9. A transport means as claimed in claim 1 wherein oscillatory movement is imparted to the elongated member by an eccentric mechanism.

10. A transport means as claimed in claim 1 wherein oscillatory movement is imparted to the elongated member by a vibratory device.

11. A transport means as claimed in claim 8 wherein tensioning means is incorporated in the flexible cable for the tensioning thereof.

12. A transport means as claimed in claim 1 wherein the unidirectional driving device incorporates an overrun device to allow the carriage to overrun the reverse movement of the elongated member whereby movement of the carriage is substantially continuous.

13. A transport means as claimed in claim 1 wherein shock absorber means is included in the unidirectional driving device to dampen or even-out the driving force imparted to the carriage.

14. A transport means for transporting a person along a mineral face in a mineral mine comprising an elongated member, means supporting said elongated member at least at its ends so that it extends along said mineral face, between said supporting means, without reverse bending, means for oscillating said elongated member in the direction of its length, a carriage for said person and a unidirectional holding device on said carriage by which it may hold onto said elongated member and thereby be moved through a passage along said mineral face, said holding device comprising a lever pivotally mounted on the carriage, a pair of pulley wheels mounted on said lever and a single pulley wheel also mounted on said lever, the elongated member passing between said pair of pulley wheels and said single pulley wheel without reverse bending of the elongated member, each of said pulley wheels of said pair having a toothed wheel fixed for rotation with it, said toothed wheels meshing one with the other, a pawl meshing with one of said toothed wheels to hold it against rotation in one direction and a gate for positioning said lever and thereby said pulley wheels so that the elongated member is held between the single pulley wheel and one or other of the pair of pulley wheels.